US010414649B2

(12) United States Patent
Denton et al.

(10) Patent No.: US 10,414,649 B2
(45) Date of Patent: Sep. 17, 2019

(54) INTEGRATED SYSTEM AND METHOD FOR REMOVING ACID GAS FROM A GAS STREAM

(71) Applicant: Research Triangle Institute, Research Triangle Park, NC (US)

(72) Inventors: David L. Denton, Kingsport, TN (US); Raghubir P. Gupta, Durham, NC (US); Brian S. Turk, Durham, NC (US); Vijay Gupta, Cary, NC (US); Himanshu Paliwal, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 79 days.

(21) Appl. No.: 15/521,467

(22) PCT Filed: Oct. 20, 2015

(86) PCT No.: PCT/US2015/056391
§ 371 (c)(1),
(2) Date: Apr. 24, 2017

(87) PCT Pub. No.: WO2016/064825
PCT Pub. Date: Apr. 28, 2016

(65) Prior Publication Data
US 2017/0334718 A1    Nov. 23, 2017

Related U.S. Application Data

(60) Provisional application No. 62/068,333, filed on Oct. 24, 2014.

(51) Int. Cl.
*C01B 3/16*        (2006.01)
*B01D 53/48*     (2006.01)
(Continued)

(52) U.S. Cl.
CPC ............ *C01B 3/16* (2013.01); *B01D 53/1425* (2013.01); *B01D 53/1437* (2013.01);
(Continued)

(58) Field of Classification Search
CPC ......... C01B 3/16; C01B 3/52; C01B 17/0404; C01B 17/74; C01B 2203/061;
(Continued)

(56) References Cited

U.S. PATENT DOCUMENTS 4,254,094 A    3/1981 Hegarty
5,441,990 A    8/1995 Robin et al.
(Continued)

FOREIGN PATENT DOCUMENTS

EP         2253585 A1    11/2010
WO    2009059936 A2     5/2009
(Continued)

OTHER PUBLICATIONS

Final Office Action issued in counterpart U.S. Appl. No. 15/135,984 dated Apr. 18, 2018.
(Continued)

*Primary Examiner* — Anthony J Zimmer
(74) *Attorney, Agent, or Firm* — Olive Law Group, PLLC; David P. Gloekler

(57) ABSTRACT

Acid gas compounds are removed from a process gas such as, for example, syngas or natural gas, by flowing a feed gas into a desulfurization unit to remove a substantial fraction of sulfur compounds from the feed gas and flowing the resulting desulfurized gas into a $CO_2$ removal unit to remove a substantial fraction of $CO_2$ from the desulfurized gas.

30 Claims, 7 Drawing Sheets

(51) Int. Cl.
| | |
|---|---|
| B01D 53/62 | (2006.01) |
| B01D 53/14 | (2006.01) |
| B01D 53/83 | (2006.01) |
| B01D 53/96 | (2006.01) |
| B01J 7/02 | (2006.01) |
| B01J 19/00 | (2006.01) |
| C01B 3/56 | (2006.01) |
| C10K 1/00 | (2006.01) |
| C10K 1/10 | (2006.01) |
| C10K 1/20 | (2006.01) |
| C10K 1/32 | (2006.01) |
| C10K 3/04 | (2006.01) |
| C10L 3/10 | (2006.01) |
| B01D 53/52 | (2006.01) |
| B01J 20/34 | (2006.01) |
| C01B 3/52 | (2006.01) |
| C01B 17/04 | (2006.01) |
| C01B 17/74 | (2006.01) |

(52) U.S. Cl.
CPC ..... *B01D 53/1462* (2013.01); *B01D 53/1475* (2013.01); *B01D 53/48* (2013.01); *B01D 53/52* (2013.01); *B01D 53/62* (2013.01); *B01D 53/83* (2013.01); *B01D 53/96* (2013.01); *B01J 7/02* (2013.01); *B01J 19/0046* (2013.01); *B01J 20/3458* (2013.01); *B01J 20/3483* (2013.01); *C01B 3/52* (2013.01); *C01B 3/56* (2013.01); *C01B 17/0404* (2013.01); *C01B 17/74* (2013.01); *C10K 1/004* (2013.01); *C10K 1/005* (2013.01); *C10K 1/10* (2013.01); *C10K 1/20* (2013.01); *C10K 1/32* (2013.01); *C10K 3/04* (2013.01); *C10L 3/103* (2013.01); *C10L 3/104* (2013.01); *B01D 2252/2021* (2013.01); *B01D 2252/20489* (2013.01); *B01D 2253/1124* (2013.01); *B01D 2257/304* (2013.01); *B01D 2257/306* (2013.01); *B01D 2257/308* (2013.01); *B01D 2257/504* (2013.01); *B01J 2219/0059* (2013.01); *B01J 2219/00594* (2013.01); *B01J 2219/00756* (2013.01); *B01J 2219/00759* (2013.01); *C01B 2203/0283* (2013.01); *C01B 2203/0294* (2013.01); *C01B 2203/042* (2013.01); *C01B 2203/0415* (2013.01); *C01B 2203/0475* (2013.01); *C01B 2203/0485* (2013.01); *C01B 2203/061* (2013.01); *C01B 2203/1258* (2013.01); *C10L 2290/12* (2013.01); *C10L 2290/54* (2013.01); *C10L 2290/541* (2013.01); *C10L 2290/542* (2013.01); *C10L 2290/547* (2013.01); *Y02A 50/2341* (2018.01); *Y02C 10/04* (2013.01); *Y02C 10/06* (2013.01); *Y02C 10/08* (2013.01); *Y02P 20/152* (2015.11)

(58) Field of Classification Search
CPC .... C01B 2203/0485; C01B 2203/0283; C01B 2203/0475; C01B 2203/0415; C01B 2203/1258; C01B 2203/0294; C01B 2203/042; C01B 3/56; C10K 1/004; C10K 1/10; C10K 1/20; C10K 1/32; C10K 3/04; C10K 1/005; B01J 20/3483; B01J 20/3458; B01J 19/0046; B01J 7/02; B01J 2219/00594; B01J 2219/00759; B01J 2219/0059; B01J 2219/00756; B01D 53/1437; B01D 53/1475; B01D 53/52; B01D 53/96; B01D 53/83; B01D 53/1462; B01D 53/1425; B01D 53/62; B01D 53/48; B01D 2252/20489; B01D 2253/1124; B01D 2257/304; B01D 2257/306; B01D 2252/2021; B01D 2257/308; B01D 2257/504; Y02A 50/2341; Y02C 10/08; Y02C 10/06; Y02C 10/04; Y02P 20/152; C10L 3/103; C10L 2290/12; C10L 2290/541; C10L 2290/542; C10L 2290/547; C10L 2290/54; C10L 3/104

See application file for complete search history.

(56) References Cited

U.S. PATENT DOCUMENTS

| | | | |
|---|---|---|---|
| 6,375,924 | B1 | 4/2002 | Towler et al. |
| 2003/0166465 | A1* | 9/2003 | Khare ................. C10G 25/003 502/400 |
| 2006/0236697 | A1 | 10/2006 | Rao et al. |
| 2007/0031302 | A1 | 2/2007 | Wittrup et al. |
| 2007/0178035 | A1* | 8/2007 | White ..................... C01B 3/52 423/248 |
| 2008/0028765 | A1 | 2/2008 | Bartlett |
| 2008/0182912 | A1 | 7/2008 | Berg et al. |
| 2008/0271602 | A1 | 11/2008 | Tatarchuk et al. |
| 2010/0143225 | A1* | 6/2010 | Serban ............... B01D 53/1456 423/226 |
| 2011/0150730 | A1 | 6/2011 | Baugh et al. |
| 2012/0316252 | A1 | 12/2012 | Hodoshima et al. |
| 2012/0316525 | A1 | 12/2012 | Thomann et al. |
| 2013/0011325 | A1* | 1/2013 | Grover ................. B01D 53/02 423/437.1 |
| 2013/0125756 | A1 | 5/2013 | Hufton et al. |

FOREIGN PATENT DOCUMENTS

| | | |
|---|---|---|
| WO | 2011041317 A1 | 4/2011 |
| WO | 2011055132 A1 | 5/2011 |
| WO | 2012089776 A1 | 7/2012 |

OTHER PUBLICATIONS

Extended European Search Report issued in counterpart EP Application No. 15852583.2 dated Jun. 5, 2018 (nine (9) pages).
International Preliminary Report dated Apr. 25, 2017 for International Application No. PCT/US2015/056391.
International Search Report and Written Opinion dated Jan. 27, 2016 for International Application No. PCT/US2015/056391.
European Communication pursuant to Rules 70(2) and 70a(2) EPC issued in counterpart EP Application No. 15852583.2 dated Jun. 22, 2018 (one (1) page).
Non-Final office action issued in counterpart U.S. Appl. No. 16/003,716 dated May 15, 2019.

* cited by examiner

INTEGRATED SYSTEM AND METHOD FOR REMOVING ACID GAS FROM A GAS STREAM

RELATED APPLICATIONS

This application is the national stage of International Application No. PCT/US2015/056391, filed Oct. 20, 2015, titled INTEGRATED SYSTEM AND METHOD FOR REMOVING ACID GAS FROM A GAS STREAM, which claims the benefit of U.S. Provisional Patent Application Ser. No. 62/068,333, filed Oct. 24, 2014, titled "INTEGRATED SYSTEM AND METHOD FOR REMOVING ACID GAS FROM A GAS STREAM," the contents of both of which applications are incorporated herein by reference in their entireties.

TECHNICAL FIELD

The present invention generally relates to the treating or purifying a gas stream, particularly removing acid gases such as sulfur compounds and carbon dioxide from a gas stream.

BACKGROUND

Gas processing and cleanup is a critical operation in the chemical industry. Several industrial processes utilize gases that need to be cleaned and the various contaminants (such as $H_2S$, $SO_2$, COS, HCl, $NH_3$, etc.) removed prior to their use. In addition to removal of contaminants, the gas composition may also need to be adjusted to meet process requirements for $H_2$, CO and/or $CO_2$ content.

One of the process gases that are used heavily for production of chemicals and power is synthesis gas or "syngas". Syngas is produced from partial combustion of organic feedstocks (coal, petcoke, biomass, oil) and consists primarily of CO and $H_2$. Syngas often contains contaminants (including $H_2S$, COS) depending on the starting raw material. The $H_2S$ and COS in the syngas can de-activate the catalysts used in the downstream processes and need to be removed to very low levels. In case of power production, the sulfur species can oxidize and produce $SO_2$ during combustion which is regulated by the Environmental Protection Agency (EPA) to reduce acid rain. As appreciated by persons skilled in the art, other process gases likewise often require cleanup, one further example being natural gas.

Several technologies have been developed to meet this need. Most of the technologies use a solvent-based approach where the gas species that need to be removed are absorbed in the solvent under pressure at ambient or sub-ambient temperatures, and the solvent is later regenerated by either flashing the solvent (reducing the pressure) or by use of thermal energy (heating the solvent). Examples of such processes include the SELEXOL® process by Dow Chemicals (licensed to UOP) which uses a mixture of dimethyl ethers of polyethylene glycol (DEPG), RECTISOL® by The Linde Group and Lurgi AG which uses methanol as the solvent, amines (such as MDEA, MEA, DEA etc.) as well as activated MDEA by BASF Corporation, Shell Corporation, and UOP. These solvent-based removal processes are typically referred to as acid gas removal (AGR) processes.

The $H_2S$, COS, and $CO_2$ are soluble in the different solvents to varying degrees, and the solvent-based processes are quite complex and are designed to separate out the $H_2S$ and COS into separate streams. $H_2S$/COS stream is used further downstream, either for sulfur recovery or production of sulfuric acid. The $CO_2$ stream can be used in enhanced oil recovery (EOR) or stored in geological aquifers or can be used to produce value-added products such as algae, among other uses.

Chemical applications of syngas, such as methanol conversion or Fischer-Tropsch conversion to fuels, typically require the sulfur levels in the syngas to be very low, such as less than 100 ppbv. This ultra-low sulfur requirement is difficult for most AGR processes to achieve. It would be desirable to be able to decouple the process of removing sulfur compounds from the process of removing $CO_2$ in a way that would optimize the removal of both sulfur compounds and $CO_2$, whereby sulfur compounds could be reduced to lower levels in the process gas, and higher levels of purity of the sulfur compounds and $CO_2$ could be achieved, than would be possible from performing any of the conventional AGR processes alone. Such decoupling could enable a number of these AGR technologies to be used effectively in process gas-to-chemicals or fuels applications where these AGR technologies cannot be used currently and/or could enable a reduction in capital costs and/or utility costs.

Syngas is the starting material for production of a variety of chemicals. Syngas can also be used for power production in a gas turbine. Syngas can also be used to produce $H_2$, by converting the CO to $H_2$ via the water-gas-shift (WGS) process and removing the $CO_2$ in the gas stream and purifying the treated gas using a pressure swing adsorption (PSA) or a membrane process. The $H_2$ to CO ratio of the process gas needs to be carefully adjusted to meet the downstream applications demand.

The WGS reaction is utilized to shift carbon monoxide (CO) to carbon dioxide ($CO_2$) and diatomic hydrogen gas ($H_2$) by reacting the CO with steam over a catalyst bed. WGS is an industrially important process utilized to increase the $H_2$/CO ratio to meet the downstream process requirements of a particular application. For example, WGS finds applications in pre-combustion $CO_2$ capture where a fuel is partially oxidized to produce synthesis gas (or "syngas," predominantly consisting of CO+$H_2$). This syngas is shifted to maximize the $H_2$ and $CO_2$ concentrations, and $CO_2$ is removed prior to combustion of the $H_2$-rich clean gas in turbines for generating electricity. WGS also finds widespread applications in chemicals production where the $H_2$/CO ratio needs to be adjusted as per the process requirements. For example, the synthesis of methanol ($CH_3OH$), CO+2$H_2$→$CH_3OH$, requires the $H_2$/CO ratio to be 2.

In traditional AGR processes such as the RECTISOL® and SELEXOL® processes, the WGS is done upstream of the AGR process and is called a "sour gas shift." The gas to be shifted contains sulfur (as hydrogen sulfide ($H_2S$) and carbonyl sulfide (COS)) and requires an expensive catalyst that is sulfur tolerant and promotes the shift reaction in the presence of $H_2S$ and COS. Examples of sulfur tolerant shift catalysts include cobalt-molybdenum (Co—Mo) and nickel-molybdenum (Ni—Mo). When the shift is carried out downstream of the AGR, it is termed as "sweet gas shift" and does not require a sulfur tolerant catalyst. The sweet shift catalysts are less expensive than the sulfur-tolerant sour gas shift catalyst. Thus, it would be desirable to be able to decouple the process of removing sulfur compounds from the process of removing $CO_2$ so as to facilitate implementation of the WGS downstream of the sulfur removal process. This may enable better control over the $H_2$/CO ratio and/or removal of $CO_2$, as well as the use of the less expensive sweet shift catalysts.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a method for removing acid gases from a gas stream includes: flowing a feed gas into a desulfurization unit to remove a substantial fraction of sulfur compounds from the feed gas, wherein the desulfurization unit produces a desulfurized gas; and flowing the desulfurized gas into a $CO_2$ removal unit to remove a substantial fraction of $CO_2$ from the desulfurized gas.

According to another embodiment, a method for removing acid gases from a gas stream includes: flowing a feed gas stream comprising carbon monoxide (CO), carbon dioxide ($CO_2$), and a sulfur compound into contact with a sorbent stream in an adsorber unit to produce a first output gas stream, wherein the sorbent stream comprises a particulate sorbent compound effective for removing the sulfur compound from the feed gas stream, and the first output gas stream comprises a desulfurized gas comprising CO and $CO_2$, and a sulfided sorbent; separating the desulfurized gas from the sulfided sorbent; flowing the sulfided sorbent into contact with a regenerating agent in a regenerator unit to produce a second output gas stream, wherein the regenerating agent has a composition effective for removing sulfur from the sulfided sorbent, and the second output gas stream comprises regenerated sorbent compound and a sulfur compound; separating the regenerated sorbent compound from the sulfur compound; flowing the regenerated sorbent compound into the adsorber unit; flowing the desulfurized gas into contact with a $CO_2$ removing agent in a $CO_2$ removal unit to produce a treated gas comprising CO and substantially reduced fractions of sulfur and $CO_2$.

In some embodiments, the feed gas is flowed into the desulfurization unit at a temperature of about 400° F. (204° C.) or greater.

In some embodiments, the desulfurized gas is flowed into $CO_2$ removal unit at a temperature of about −80° F. (−62° C.) or greater.

In some embodiments, the feed gas stream includes carbon monoxide (CO), carbon dioxide ($CO_2$), hydrogen ($H_2$), syngas, shifted syngas, a hydrocarbon (HC), or natural gas.

In some embodiments, the sulfur compound of the feed gas stream includes hydrogen sulfide ($H_2S$), carbonyl sulfide (COS), carbon disulfide ($CS_2$) and/or other disulfide(s), and/or one or more mercaptans.

In some embodiments, the feed gas stream is subjected to a WGS reaction before desulfurization or after desulfurization. In some embodiments, the WGS is performed after desulfurization and before $CO_2$ removal.

According to another embodiment, a gas processing system is configured for performing any of the methods disclosed herein.

According to another embodiment, a gas processing system includes: a desulfurization unit configured for removing a substantial fraction of a sulfur compound from a process gas to produce a desulfurized gas; and a $CO_2$ removal unit positioned downstream from the desulfurization unit, and configured for removing a substantial fraction of $CO_2$ from the desulfurized gas.

According to another embodiment, the desulfurization unit, the $CO_2$ removal unit, or both, include at least one of the following: a fixed-bed reactor, a moving-bed reactor, a fluidized-bed reactor, a transport reactor, a monolith, a micro-channel reactor, an absorber and/or adsorber unit, and an absorber and/or adsorber unit in fluid communication with a regenerator unit.

According to another embodiment, the gas processing system includes a water-gas shift unit positioned upstream or downstream from the desulfurization unit, and configured for shifting the process gas to produce carbon dioxide ($CO_2$) and hydrogen gas ($H_2$).

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
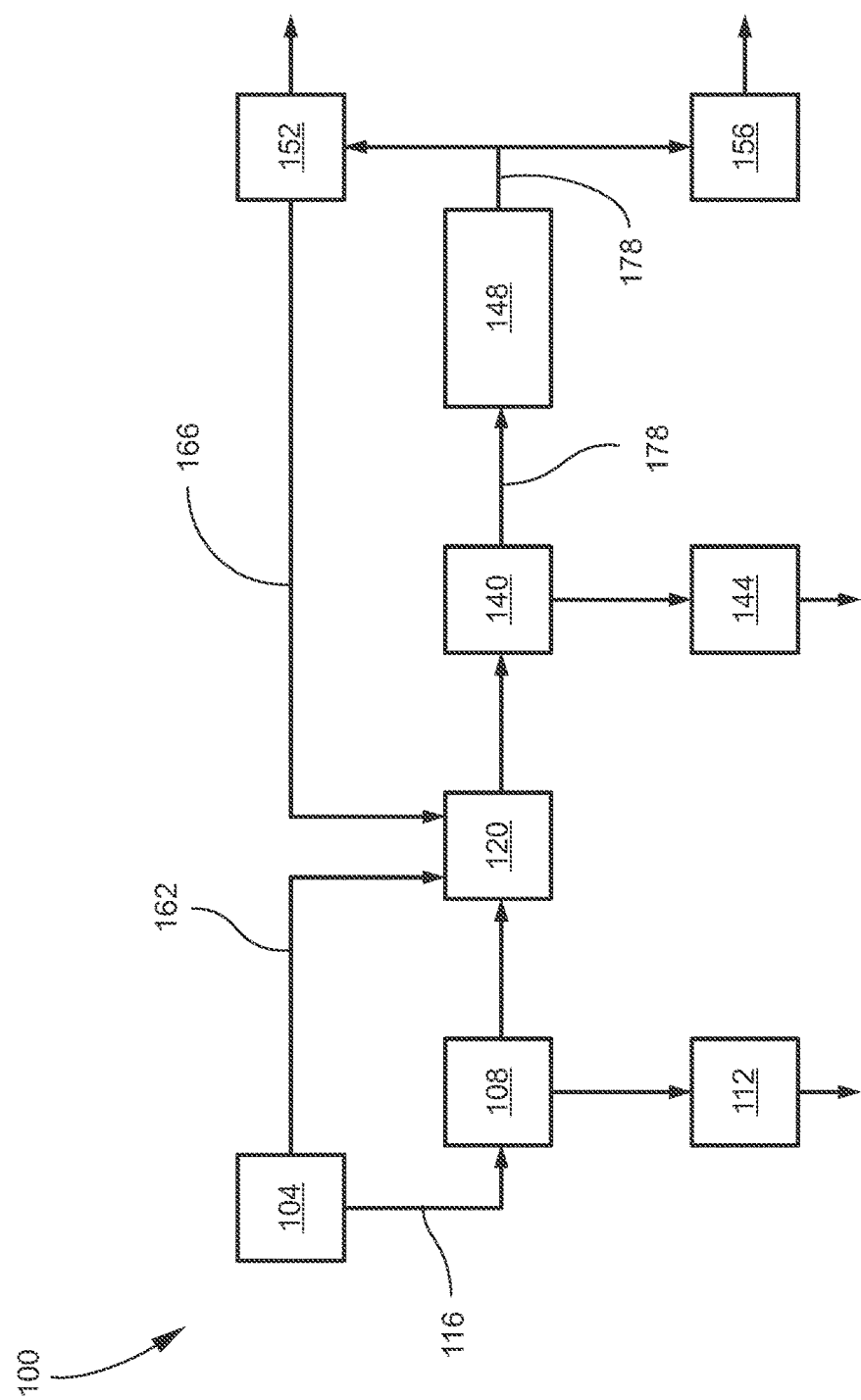
FIG. 1 is a schematic view of an example of a gas processing system in which acid gas removal methods disclosed herein may be implemented according to some embodiments.

As used herein, the term "syngas" refers to synthesis gas. In the context of the present disclosure, syngas is a mixture of at least carbon monoxide (CO) and diatomic hydrogen gas ($H_2$). Depending on the embodiment, syngas may additionally include other components such as, for example, water, air, diatomic nitrogen gas ($N_2$), diatomic oxygen gas ($O_2$), carbon dioxide ($CO_2$), sulfur compounds (e.g., hydrogen sulfide ($H_2S$), carbonyl sulfide (COS), sulfur oxides ($SO_x$), etc.), nitrogen compounds (e.g., nitrogen oxides ($NO_x$), etc.), metal carbonyls, hydrocarbons (e.g., methane ($CH_4$)), ammonia ($NH_3$), chlorides (e.g., hydrogen chloride (HCl)), hydrogen cyanide (HCN), trace metals and metalloids (e.g., mercury (Hg), arsenic (As), selenium (Se), cadmium (Cd), etc.) and compounds thereof, particulate matter (PM), etc.

As used herein, the term "natural gas" refers to a mixture of hydrocarbon (HC) gases consisting primarily of methane and lesser amounts of higher alkanes. Depending on the embodiment, natural gas may additionally include non-HC species such as one or more of those noted above, as well as carbon disulfide ($CS_2$) and/or other disulfides, and mercaptans (thiols) such as methanethiol ($CH_3SH$) and ethanethiol ($C_2H_5SH$) and other organosulfur compounds.

As used herein, the term "fluid" generally encompasses the term "liquid" as well as term "gas" unless indicated otherwise or the context dictates otherwise. The term "fluid" encompasses a fluid in which particles are suspended or carried. The term "gas" encompasses a gas that includes or entrains a vapor or liquid droplets. The term "fluid," "liquid" or "gas" encompasses a "fluid," "liquid" or "gas" that includes a single component (species) or a mixture of two or more different components. Examples of multicomponent mixtures include, but are not limited to, syngas and natural gas as described above.

As used herein, the term "process gas" generally refers to any gas initially containing one or more sulfur compounds and $CO_2$. A process gas at an initial stage of a gas processing method as disclosed herein, i.e., when initially inputted to a gas processing system as disclosed herein, may also be referred to as a "raw gas" or a "feed gas." A process gas after undergoing desulfurization and $CO_2$ removal according to a gas processing method as disclosed herein may also be referred to as a "treated gas," "clean gas," "cleaned gas," or "purified gas." The term "process gas" generally is not limiting as to the composition of the gas at any particular stage of the gas processing method. For example, the term "process gas" does not by itself provide any indication of the concentrations of sulfur compounds, $CO_2$, or other species in the gas at any particular time. Examples of process gases include, but are not limited to, syngas and natural gas as described above. Further examples of process gases are gases that include one or more of: CO, $CO_2$, $H_2$, and hydrocarbon(s) (HCs).

The present disclosure provides methods for removing acid gases from a gas stream. In certain embodiments, the method entails a warm-gas desulfurization process (WDP) in which a solid sorbent is utilized to selectively remove sulfur compounds such as $H_2S$ and COS from a process gas. The sorbent may be regenerable or disposable. The desulfurization process may take place at a temperature of about 400° F. or greater. The sulfur compounds removed from the process gas may thereafter be recovered, or utilized to produce other sulfur compounds, and/or utilized to recover elemental sulfur by performing the conventional Claus process or other sulfur recovery process.

The WDP may be provided as an upstream process that is integrated with a downstream $CO_2$ removal process to provide an overall AGR process. The WDP may further be integrated with additional downstream processes effective for removing other contaminants or impurities, thereby providing a comprehensive gas cleaning process. Generally, it is presently contemplated that the WDP is compatible with any $CO_2$ removal process. In some embodiments, the $CO_2$ removal process may be an AGR process modified to primarily or exclusively (or selectively) remove $CO_2$. In all such embodiments, the integrated gas treatment process decouples the sulfur removal from the $CO_2$ removal, which may simplify the process and dramatically reduce the capital costs and operating expenses of the process. Moreover, the decoupling of removal of sulfur and $CO_2$ using WDP may enable the combination of WDP and any existing or emerging AGR process to remove sulfur to lower levels and produce purer sulfur and CO2 byproduct streams than achievable by any of the AGR processes alone. Moreover, the upstream placement of WDP may enable a number of these AGR technologies to be used effectively in process gas-to-chemicals or fuels applications where they cannot be used currently. Furthermore, the decoupling of upstream WDP from the $CO_2$ removal opens up the possibility of performing a WGS process downstream of the sulfur removal process, i.e., sweet gas shifting. As noted above, the sweet shift catalysts are significantly less expensive than the sulfur-tolerant sour gas shift catalysts, thus leading to further cost savings.

According to some embodiments, the method for removing acid gases from a gas stream includes flowing a feed gas into a desulfurization unit to remove a substantial fraction of sulfur compounds from the feed gas. The resulting desulfurized gas is then flowed into a $CO_2$ removal unit to remove a substantial fraction of $CO_2$ from the desulfurized gas.

In various embodiments, the desulfurization unit and/or the $CO_2$ removal unit may include one of the following configurations: a fixed-bed reactor, a moving-bed reactor, a fluidized-bed reactor, a transport reactor, a monolith, a micro-channel reactor, an absorber and/or adsorber unit, or an absorber and/or adsorber unit in fluid communication with a regenerator unit.

According to further embodiments, the method for removing acid gas from a gas stream may include flowing a feed gas stream including carbon monoxide (CO), carbon dioxide ($CO_2$), and a sulfur compound into contact with a sorbent stream in an adsorber unit to produce a first output gas stream. The first output gas stream includes a desulfurized gas (including at least CO and $CO_2$) and a sulfided (or sulfur loaded) sorbent. The desulfurized gas is then separated from the sulfided sorbent. The resulting desulfurized gas is then flowed into contact with a $CO_2$ removing agent in a $CO_2$ removal unit to produce a treated gas that includes CO and substantially reduced fractions of sulfur and $CO_2$. During the desulfurization process, the sorbent compound is regenerated. Specifically, after separating the sulfided sorbent from the desulfurized gas, the sulfided sorbent is flowed into contact with a regenerating agent in a regenerator unit to produce a second output gas stream that includes regenerated sorbent compound and a sulfur compound. The regenerated sorbent compound is then separated from the sulfur compound produced in the regenerator unit, and the regenerated sorbent compound is then flowed into the adsorber unit for reuse in the desulfurization process. The sulfur compound produced in the regenerator unit is outputted from the regenerator unit and may be recovered, or subjected to further processing to synthesize different sulfur compounds of interest or elemental sulfur. Additionally, the $CO_2$ removed by the $CO_2$ removal unit is outputted from the $CO_2$ removal unit and may be recovered or subjected to further processing as desired.

The process gas subjected to the foregoing acid gases removal method may be any gas that includes one or more types of sulfur compounds and $CO_2$, and may be supplied from any suitable feed gas source. Examples of process gases include, but are not limited to, exhaust gases (or flue gases) outputted from a combustion process (e.g., from a power plant, boiler, furnace, kiln or the like fired by a fossil fuel such as coal or other carbonaceous materials, an internal combustion engine, etc.); natural gas; a syngas produced by the gasification of fossil fuels or biomass materials or waste materials or reforming of natural gases; or the byproduct of a chemical conversion or synthesis process. In some embodiments in which the process gas is syngas, the syngas may be a shifted syngas, thus containing an increased amount of $CO_2$ to be removed by the acid gas removal method. The shifted syngas may be the result of a process (e.g., water-gas shift) carried out upstream of the desulfurization stage of the acid gas removal method.

The sorbent stream may be formed by a solid particulate sorbent carried in any suitable process gas such as, for example, syngas or inert carrier gas (or aeration gas) such as, for example, nitrogen (N2). The sorbent stream may flow through the adsorber unit in a co-flow, counter-flow, or cross-flow relation to the flow of the feed gas in the adsorber unit. In some embodiments, the particles of the sorbent compound have an average particle size in a range from about 35 μm to about 175 μm. In the present context, "size" or "characteristic dimension" refers to a dimension that appropriately characterizes the size of the particle in view of its shape or approximated shape. For example, the particles may be characterized as being at least approximately spherical, in which case "size" may correspond to diameter. Generally, no limitation is placed on the dispersity of the particle size of the particles.

Generally, the particulate sorbent may be any sorbent compound effective for removing the sulfur compound from the feed gas stream, by any suitable mechanism or combination of mechanisms such as adsorption, absorption, or chemical reaction. Examples of sorbent compounds effective for sulfur removal include, but are not limited to, metal oxides such as zinc oxide, copper oxide, iron oxide, vanadium oxide, manganese oxide, stannous oxide, and nickel oxide; metal titanates such as zinc titanate; metal ferrites such as zinc ferrite and copper ferrite; and a combination of two or more of the foregoing. The sorbent may be regenerable or non-regenerable (or at least disposable). Thus, certain embodiments of the method may entail regenerating the sorbent, while other embodiments do not.

In some embodiments, the particles may be polyphase materials. For example, the particles may comprise a metal oxide phase and a metal aluminate phase, e.g. a zinc oxide (ZnO) phase and a zinc aluminate ($ZnAl_2O_4$) phase. More generally, the sorbent may include a support such as, for example, alumina ($Al_2O_3$), silicon dioxide ($SiO_2$), titanium dioxide ($TiO_2$), a zeolite, or a combination of two or more of the foregoing.

Taking metal oxide as an example of the sorbent, the reactions associated with removing $H_2S$ and COS from the process gas may be expressed as follows:

$$MO+H_2S \rightarrow MS+H_2O, \text{ and}$$

$$MO+COS \rightarrow MS+CO_2,$$

where M is the active metal of the metal oxide sorbent, MO is the metal oxide, and MS is the metal sulfide (the sulfided sorbent).

Generally, the regenerating agent may be any compound effective for removing sulfur from the particular sulfided sorbent utilized in the method, i.e., for regenerating the sorbent compound or enhancing regeneration of the sorbent compound in the regenerator unit. In some embodiments, the regenerating agent may be a stripping gas that is flowed into contact with the sulfided sorbent to enhance recovery of the sorbent compound during a flash vaporization regeneration process. In some embodiments, the regenerating agent desorbs the sulfur from the sulfided sorbent. In some embodiments, the regenerating agent comprises air or oxygen gas ($O_2$) or an oxygen compound, and the sulfur compound of the second output gas stream comprises sulfur dioxide. In this case, again taking metal oxide as an example of the sorbent, the regeneration process converts the metal sulfide back to the metal oxide, as expressed by:

$$MS+(3/2)O_2 \rightarrow MO+SO_2.$$

After separating the regenerated sorbent compound from the $SO_2$ or other sulfur compound, the gas stream containing the $SO_2$ or other sulfur compound may be routed to any desired destination for any desired purpose, such as recovering the $SO_2$ for further use, producing sulfuric acid or other desired sulfur compound, and/or producing elemental sulfur by any suitable process.

As noted above, the desulfurization process is a warm gas desulfurization process. In some embodiments, the desulfurization process is implemented in the adsorber unit at a temperature of about 400° F. or greater. In some embodiments, the desulfurization process is implemented in the adsorber unit at a temperature in a range from about 400° F. to about 1100° F. In some embodiments, the desulfurization process is implemented in the adsorber unit at a pressure in a range from about atmospheric pressure to about 1500 psia. The regeneration process is typically carried out at a higher temperature than the desulfurization process. In some embodiments, the regeneration process is implemented in the regenerator unit at a temperature of about 900° F. or greater. In some embodiments, the regeneration process is implemented in the regenerator unit at a temperature in a range from about 900° F. to about 1400° F. In some embodiments, the regeneration process is implemented in the adsorber unit at a pressure in a range from about atmospheric pressure to about 1500 psia.

The adsorber unit generally may have any configuration suitable for maintaining flows of the feed gas and the sorbent stream with sufficient time of contact between the feed gas and sorbent, and at a temperature and pressure, effective for reducing the concentration of sulfur compounds in the feed gas by a desired amount. For such purposes, the adsorber unit generally may include a vessel having an inlet for the feed gas, an inlet for the regenerated sorbent, and an outlet for the above-described first output gas stream (desulfurized gas and sulfided sorbent). Alternatively, the vessel may include a solids separation zone, in which case the vessel may include respective outlets for a desulfurized gas stream and a sulfided sorbent stream. In some embodiments, the vessel may also include one or more inlets for adding fresh make-up sorbent, inert carrier gas, and/or any other additive fluid. In some embodiments, the adsorber unit may include two or more vessels fluidly coupled by transfer pipes. Multiple vessels may be configured for implementing multiple adsorption stages, and/or for implementing different functions. For example, one vessel may be configured primarily for accumulating or holding sorbent material and/or for establishing a sorbent-laden gas stream, while another vessel may be configured primarily for establishing a fluidized zone in which the interaction (or the majority of the interaction) between the feed gas and sorbent takes place. As another example, a vessel may be configured for temperature control, pressure control, or solids separation.

The regenerator unit may be fluidly coupled to the adsorber unit by one or more transfer pipes or other appropriate plumbing. The regenerator unit generally may have any configuration suitable for promoting contact between the sulfided sorbent and regenerating agent for a period of time and at a temperature and pressure effective for regenerating an acceptable amount of sorbent for redeployment in the adsorber unit. For such purposes, the regenerator unit generally may include a vessel having an inlet for the sulfided sorbent, an inlet for the regenerating agent, and an outlet for the above-described second output gas stream (regenerated sorbent compound and off-gas sulfur compound). Alternatively, the vessel may include a solids separation zone, in which case the vessel may include respective outlets for a regenerated sorbent stream and an off-gas sulfur compound stream. Similar to the adsorber unit, in some embodiments the regenerator unit may include two or more vessels for implementing multiple regeneration stages and/or specific functions.

The process of separating the desulfurized gas from the sulfided sorbent in the adsorber unit, and the process of separating the regenerated sorbent compound from the sulfur compound (e.g., $SO_2$) produced in the regenerator unit, may generally be implemented by any means effective for the composition of the gases and sulfided sorbent to be separated. In some embodiments, separation may be implemented by flowing the first output gas stream produced in the adsorber unit, and the second output gas stream produced in the regenerator unit, into respective solids separators (solid separator devices). The respective solids separators may be physically located downstream of the adsorber unit and the regenerator unit, or alternatively may be integrated with the adsorber unit and the regenerator unit in respective separation zones thereof. Examples of a solids separator include, but are not limited to, a cyclone separator, an electrostatic precipitator, a filter, and a gravity settling chamber.

In some embodiments, the composition and properties of the sorbent compound, the method for fabrication of the sorbent compound, the use of the sorbent compound in removing sulfur compounds, the subsequent regeneration of the sorbent compound, and the configuration of the adsorber unit and the regenerator unit, may be in accordance with descriptions provided in one or more of the following references: U.S. Patent Nos. 8,696,792; 6,951,635; 6,306,793; 5,972,835; 5,914,288; and 5,714,431; the entire contents of each of which are incorporated by reference herein.

Embodiments of the acid gas removal method may be highly effective for removing substantially all sulfur content from the process gas, while minimizing attrition of the sorbent utilized for desulfurization. In some embodiments, the desulfurized gas outputted from the adsorber unit (and separated from the sulfur-laden sorbent) has a sulfur concentration of about 25 parts per million (ppm) by volume or less.

As described above, the acid gas removal method includes flowing the desulfurized gas to a $CO_2$ removal unit where it is contacted with a $CO_2$ removing agent. By implementing the upstream warm gas desulfurization process described herein, the application of external refrigeration or sub-ambient cooling requirements for removing $CO_2$ are reduced or eliminated. In particular, the desulfurized gas fed to the $CO_2$ removal unit need not be cryogenically cooled via a refrigeration system. In some embodiments, flowing the desulfurized gas into contact with the $CO_2$ removing agent is done at a temperature ranging from about −80° F. to about 30° F. In other embodiments, flowing the desulfurized gas into contact with the $CO_2$ removing agent is done at a temperature ranging from about 30° F. to about 130° F. In other embodiments, a warm gas $CO_2$ removal process may be performed. As one non-limiting example of the latter case, the desulfurized gas may be flowed into contact with the $CO_2$ removing agent at a temperature ranging from about 200° F. to about 900° F.

Generally, the $CO_2$ removing agent may be any agent effective for capturing $CO_2$ from the desulfurized gas stream. In some embodiments, the $CO_2$ removing agent may be a solvent-based agent that removes $CO_2$ by gas absorption and subsequent regeneration. Thus, in some embodiments, the $CO_2$ removing agent is a physical solvent such as utilized in the RECTISOL® process, the SELEXOL® process, the PURISOL® process (Lurgi AG Corp., Frankfurt, Fed. Rep. of Germany), and the Fluor Solvent™ process. Examples of such solvents effective as $CO_2$ removing agents include, but are not limited to, methanol, a mixture of dimethyl ethers of polyethylene (DEPG), N-methyl-2-pyrrolidone (NMP), sulfolane (2,3,4,5-tetrahydrothiophene-1,1-dioxide), propylene carbonate ($C_4H_6O_3$), and a combination of two or more of the foregoing.

In other embodiments, the $CO_2$ removing agent may be a chemical solvent such as amine-based solvents; formulated amines such as aMDEA (BASF Corp., Florham Park, N.J., USA), ADIP (Shell Global Solutions International B.V, The Hague, The Netherlands), and Amine Guard™ FS process solvent (UOP A Honeywell Company, Des Plaines, Ill., USA); and the Benfield™ process solvent (UOP). Examples of such solvents effective as $CO_2$ removing agents include, but are not limited to, methyldiethanolamine (MDEA), activated MDEA (aMDEA), monoethanolamine (MEA), diethanolamine (DEA), triethanolamine (TEA), diisopropanolamine (DIPA), diglycolamine (DGA), potassium carbonate ($K_2CO_3$), and a combination of two or more of the foregoing.

In other embodiments, the $CO_2$ removing agent may be a hybrid solvent that combines the high purity gas treatment offered by chemical solvents with the flash regeneration and lower energy requirements of physical solvents. Thus, in some embodiments, the $CO_2$ removing agent may be a solvent or mixture of solvents such as Sulfinol™ (Shell), FLEXSORB® PS solvent (ExxonMobil Chemical Company, Houston, Tex., USA), and UCARSOL® LE solvent (Union Carbide Corporation, Danbury, Conn., USA). Examples of such solvents effective as $CO_2$ removing agents include, but are not limited to, a mixture of sulfolane (2,3,4,5-tetrahydrothiophene-1,1-dioxide), water, and one or more of methyldiethanolamine (MDEA), piperazine ($C_4H_{10}N_2$), and diisopropanolamine (DIPA).

In other embodiments, the $CO_2$ removing agent may be a sorbent-based agent. Examples include, but are not limited to, alkali metal oxides, alkali metal carbonates, lithium silicate, amine-functionalized solid sorbents, amine-functionalized silica, amine-functionalized zeolites, amine-functionalized hydrotalcites, amine-functionalized metal-organic frameworks, and a combination of two or more of the foregoing.

In other embodiments, the $CO_2$ removing agent may be a membrane effective for dissolution and diffusion of $CO_2$. The membrane material may, for example, be polymer- or cellulose-based.

In some embodiments, the $CO_2$ removal unit may include a vessel configured as an absorber unit and another vessel configured as a regenerator unit. The absorber unit may include an inlet for receiving the desulfurized gas to be treated, and another inlet for receiving a $CO_2$-lean fluid stream containing regenerated $CO_2$ removing agent, an outlet for outputting the treated gas (the process gas after $CO_2$ removal), and another outlet for outputting a $CO_2$-rich fluid stream containing the $CO_2$ removing agent and captured $CO_2$. A liquid-based $CO_2$ removing agent, or a particulate-based $CO_2$ removing agent carried in a carrier gas, may flow into contact with the desulfurized gas in the absorber unit. On the other hand, in the case of a solid-based $CO_2$ removing agent provided as a fixed-bed, or a membrane-based $CO_2$ removing agent, these types of $CO_2$ removing agents may be supported by appropriate means in the adsorber unit so as to be adequately exposed to the flow of the desulfurized gas. The regenerator unit may include an inlet for receiving the $CO_2$-rich stream produced in the adsorber unit via a transfer line, an outlet for outputting the $CO_2$ removed from the $CO_2$-rich stream as a $CO_2$ output stream, and another outlet for returning the $CO_2$-lean stream back to the adsorber unit via a transfer line. The mechanism for regenerating the $CO_2$ removing agent (converting the $CO_2$-rich stream into the $CO_2$ lean stream) may depend on the type of $CO_2$ removing agent being utilized in the method, and whether thermal or flash regeneration is implemented. In some embodiments, water in the regenerator unit is utilized as a regenerating agent. The use of an inert gas such as, for example, nitrogen may sometimes be used to facilitate stripping of the absorbed or adsorbed $CO_2$ for regeneration of the $CO_2$ removing agent.

In some embodiments, the treated gas outputted from the $CO_2$ removal unit has a $CO_2$ concentration of about 5% by volume or less.

The method may further include processing the $CO_2$ output stream from the regenerator unit by any suitable technique for recovering $CO_2$ from the $CO_2$ output stream. The recovered $CO_2$ may thereafter by utilized for any purpose, such as an end product or for chemical synthesis or for enhanced oil recovery or for geologic sequestration.

It will be noted that because the upstream desulfurization process is effective for removing substantially all of the sulfur species from the process gas, or down to any level of concentration required for the process gas, the $CO_2$ removal unit need not also be effective for removing sulfur species. Hence, the presently disclosed acid gas removal method enables the $CO_2$ removal process to be optimized for $CO_2$ removal without regard for sulfur removal. In some embodiments, the $CO_2$ removal unit or process may be characterized as being effective for removing $CO_2$ without actively removing sulfur, or without removing a substantial amount of sulfur. In some other embodiments, the $CO_2$ removal unit or process may complement the upstream desulfurization process by further reducing any residual sulfur in the desulfurized process gas. The combined integrated processes can thus achieve a lower residual sulfur content in the final cleaned process gas than could be achieved by either process step alone. The decoupling and subsequent integration of sulfur removal and $CO_2$ removal process steps could enable an AGR process to meet sulfur level requirements for conversion of process gas to chemicals or fuels, where a single AGR process that combines sulfur removal and $CO_2$ removal could not. In all embodiments, the goal of optimized sulfur and $CO_2$ removal would be the production of a treated gas and byproduct streams (sulfur compounds and $CO_2$) that eliminate or substantially reduce the number or complexity of subsequent cleaning processing requirements.

In some embodiments, the presently disclosed method further includes subjecting the process gas to one or more stages of a water-gas shift (WGS) reaction. WGS is a moderately exothermic reversible reaction and is expressed by:

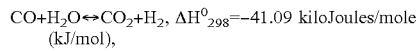
CO+H$_2$O↔CO$_2$+H$_2$, $\Delta H^0_{298}$=−41.09 kiloJoules/mole (kJ/mol), where $\Delta H^0_{298}$ is the enthalpy of reaction at 298 kelvin (K).

The equilibrium of this reaction shows significant temperature dependence and the equilibrium constant decreases with an increase in temperature. The reaction is thermodynamically favored at low temperatures and kinetically favored at high temperatures. Thus, higher carbon monoxide conversion is observed at lower temperatures. In order to take advantage of both the thermodynamics and kinetics of the reaction, the industrial scale WGS is conventionally conducted in multiple adiabatic stages with cooling in-between the reactors. As there is no change in the volume from reactants to products, the reaction is not affected by pressure.

The water gas shift process uses steam to shift CO to $CO_2$ and produces $H_2$ in the process. In addition to being a reactant, the steam also serves to move the equilibrium of the water gas shift forward to higher $H_2$ and to control the temperature rise from the exothermic water gas shift reaction, which if left unchecked could de-activate the catalyst. The steam is also required to prevent coking on the catalyst surface, which also deactivates the catalyst. Most catalyst vendors require a steam to dry gas ratio of 2.0 or higher to prevent catalyst de-activation.

Generally, the WGS may be implemented upstream or downstream of the desulfurization process. As noted above, the method disclosed herein, by decoupling the sulfur removal process and the $CO_2$ removal process, facilitates carrying out a sweet shift reaction downstream of the desulfurization process, for example between the sulfur removal process and the $CO_2$ removal process. Thus, in some embodiments a WGS unit including a suitable shift catalyst (which may be inexpensive compared to known sulfur-tolerant shift catalysts) and an input for steam may be positioned between the desulfurization unit and the $CO_2$ removal unit. In this case, the desulfurized gas is flowed into contact with steam in the presence of a shift catalyst to produce $CO_2$ and $H_2$, and subsequently is subjected to the $CO_2$ removal process. This configuration may be useful, for example, when it is desired that the treated gas resulting from the presently disclosed method have a desired level of $H_2$ richness or a desired $H_2$/CO ratio. For example, the increased level of $CO_2$ in the process gas outputted from the WGS unit may then be adequately removed by the downstream $CO_2$ removal unit.

FIG. 1 is a schematic view of an example of a gas processing system 100 in which acid gas removal methods disclosed herein may be implemented according to some embodiments. Generally, the gas processing system 100 may represent any system configured for cleaning or treating a gas stream, particularly for removing acid gas compounds (and optionally other contaminants or impurities) from the gas stream. Thus, the gas processing system 100 may have utility in a wide range of different applications. In some embodiments, the gas processing system 100 may be or be part of an integrated gasification combined cycle (IGCC) system. Generally, the gas processing system 100 includes a plurality of units in which specific functions are performed on the process gas stream flowing or contained in that particular unit (absorption/adsorption, regeneration, reaction, solids separation, etc.). In FIG. 1 (and in other schematic figures included in the present disclosure), the various lines between the units and other components schematically represent the fluid plumbing utilized to conduct various gas streams from one point to another in the gas processing system 100, and arrows represent the general direction of fluid flow through a line. Thus, the fluid lines may represent various types of fluid conduits and other types of fluidic components utilized to establish, control and manipulate fluid flows or streams of fluid (e.g., pumps, valves, fluid fittings, fluid couplings, mixers, fluid stream mergers, heaters, coolers, pressure regulators, etc.), as well as measuring instruments (e.g., temperature sensors, pressure sensors, etc.). The fluid plumbing may be arranged and configured in a variety of ways as appreciated by persons skilled in the art.

The gas processing system 100 may include a feed gas source 104, a desulfurization system (or unit) 108, and a $CO_2$ removal system (or unit) 140. In various different embodiments, the gas processing system 100 may further include one or more of the following: a sulfur recovery system (or unit) 112, a water-gas shift (WGS) system (or unit) 120, a $CO_2$ recovery system (or unit) 144, and a contaminant removal system (or unit) 148. The gas processing system 100 may further include one or more additional systems that consume the clean process gas produced by the gas processing system 100 such as, for example, a power generation system (power plant) 152 and/or a chemical or fuel synthesis system 156. Generally, the desulfurization system 108, sulfur recovery system 112, WGS system 120, $CO_2$ removal system 140, $CO_2$ recovery system 144, and contaminant removal system 348 may have any configurations, now known or later developed, suitable for removing sulfur compounds from the process gas, optionally recovering the sulfur, optionally shifting the CO in the process gas to $CO_2$ and $H_2$, removing $CO_2$ from the process gas, optionally recovering the $CO_2$, and optionally removing one or more other types of contaminants from the process gas, respectively. The desulfurization system 108 and $CO_2$ removal system 140 may be configured and operated as described above, and as further described below by way of additional embodiments and examples. The contaminant removal system 148 may schematically represent one or more different systems configured for removing one or more types of contaminants such as, for example, nitrogen compounds, metal carbonyls, hydrocarbons, ammonia, chlorides, hydrogen cyanide, trace metals and metalloids, particulate matter (PM), etc. The power generation system 152 may include one or more gas turbines and associated electrical power generators, boilers, steam turbines and associated electrical power generators, etc. as appreciated by persons skilled in the art.

In the illustrated embodiment, and as described above, the desulfurization system 108 and the $CO_2$ removal system 140 are integrated, yet distinct, systems utilizing separate units for desulfurization and $CO_2$ removal, with the $CO_2$ removal process performed downstream of the desulfurization process. In such embodiments, the desulfurization system 108 may be configured for primarily or exclusively removing sulfur compounds from the process gas (as opposed to other compounds such as $CO_2$), and the $CO_2$ removal system 140 may be configured for primarily or exclusively removing $CO_2$ from the process gas (as opposed to other compounds such as sulfur compounds).

In operation, a feed gas stream 116 is routed from the feed gas source 104 to the desulfurization system 108, where substantially all of the sulfur compounds may be removed, yielding a desulfurized output gas stream which, in some embodiments, is then fed to the $CO_2$ removal system 140, or to the WGS system 120 if present as illustrated. Off-gas or tail gas containing sulfur compounds may then be processed by the sulfur recovery system 112 to recover elemental sulfur and/or recover or synthesize sulfur compounds as described above. In some embodiments in which the WGS system 120 is present, the gas processing system 100 may be configured (not specifically shown) to fully or partially bypass the WGS system 120 if desired. The WGS system 120 produces a shifted gas stream containing a desired $CO_2/H_2$ ratio. In some embodiments where the feed gas source 104 or the power generation system 152 is sufficiently local to the WGS system 120, steam may be supplied to the WGS system 120 via a steam line 162 from the feed gas source 104 (e.g., steam generated from heat produced by a coal gasifier) or via a steam line (not shown) from the power generation system 152. Water may be supplied to the WGS system 120 from a suitable source, such as a boiler feed water line 166 from the power generation system 152. The shifted gas stream outputted from the WGS system 120 is then routed to the $CO_2$ removal system 140, where substantially all of the $CO_2$ may be captured and removed, yielding a clean (treated) process gas 178 that may predominantly be comprised of CO and $H_2$, etc., depending on the composition of the feed gas inputted into the gas processing system 100. The $CO_2$ may then be recovered by the $CO_2$ recovery system 144 to provide the $CO_2$ for further use or processing. In some embodiments, the process gas is then routed from the $CO_2$ removal system 140 to the contaminant removal system 148, yielding a clean (treated) process gas 178 substantially free of contaminants in addition to sulfur compounds and $CO_2$. The clean process gas 178 may then be utilized as a source gas by the power generation system 152 to generate power and/or the chemical or fuel synthesis system 156 to synthesize chemicals or fuels.

The particular embodiment of the gas processing system 100 illustrated in FIG. 1 is configured for implementing a sweet gas shifting process. From the present disclosure, however, it will be readily appreciated that the gas processing system 100 may be reconfigured to implement a sour gas shifting process.

Figure 2:
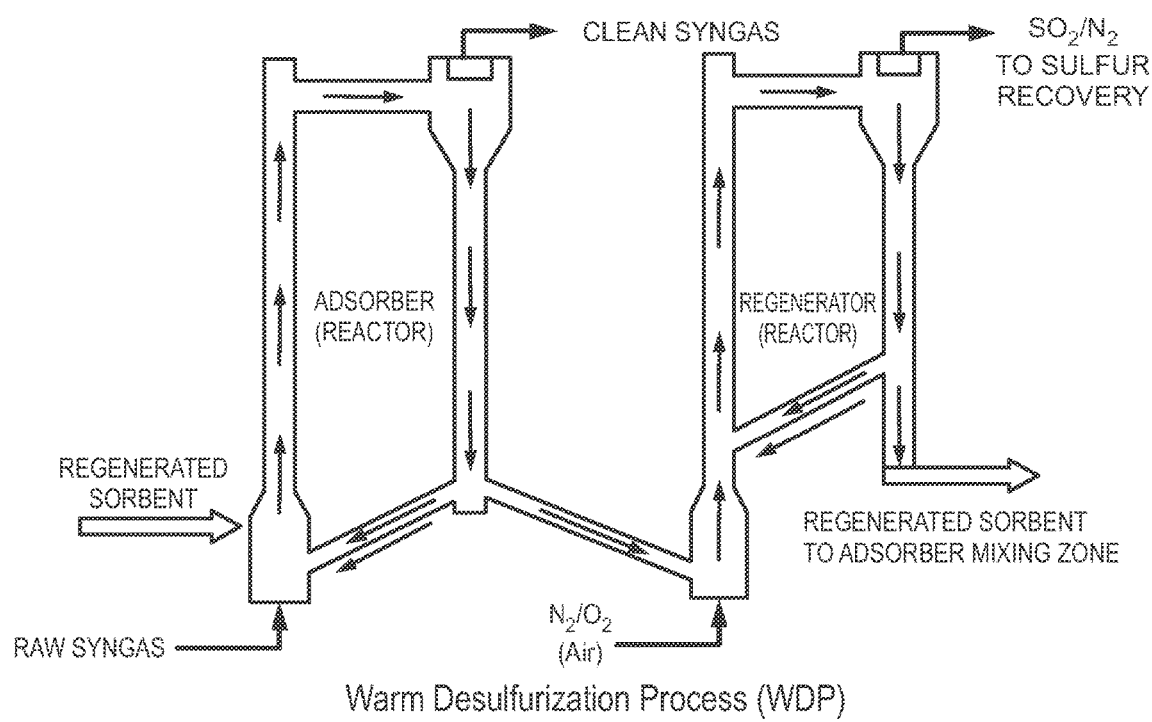
FIG. 2 is a schematic view of an example of a desulfurization system (or unit) according to some embodiments.

FIG. 2 is a schematic view of an example of a desulfurization system (or unit) according to some embodiments.

Figure 3:
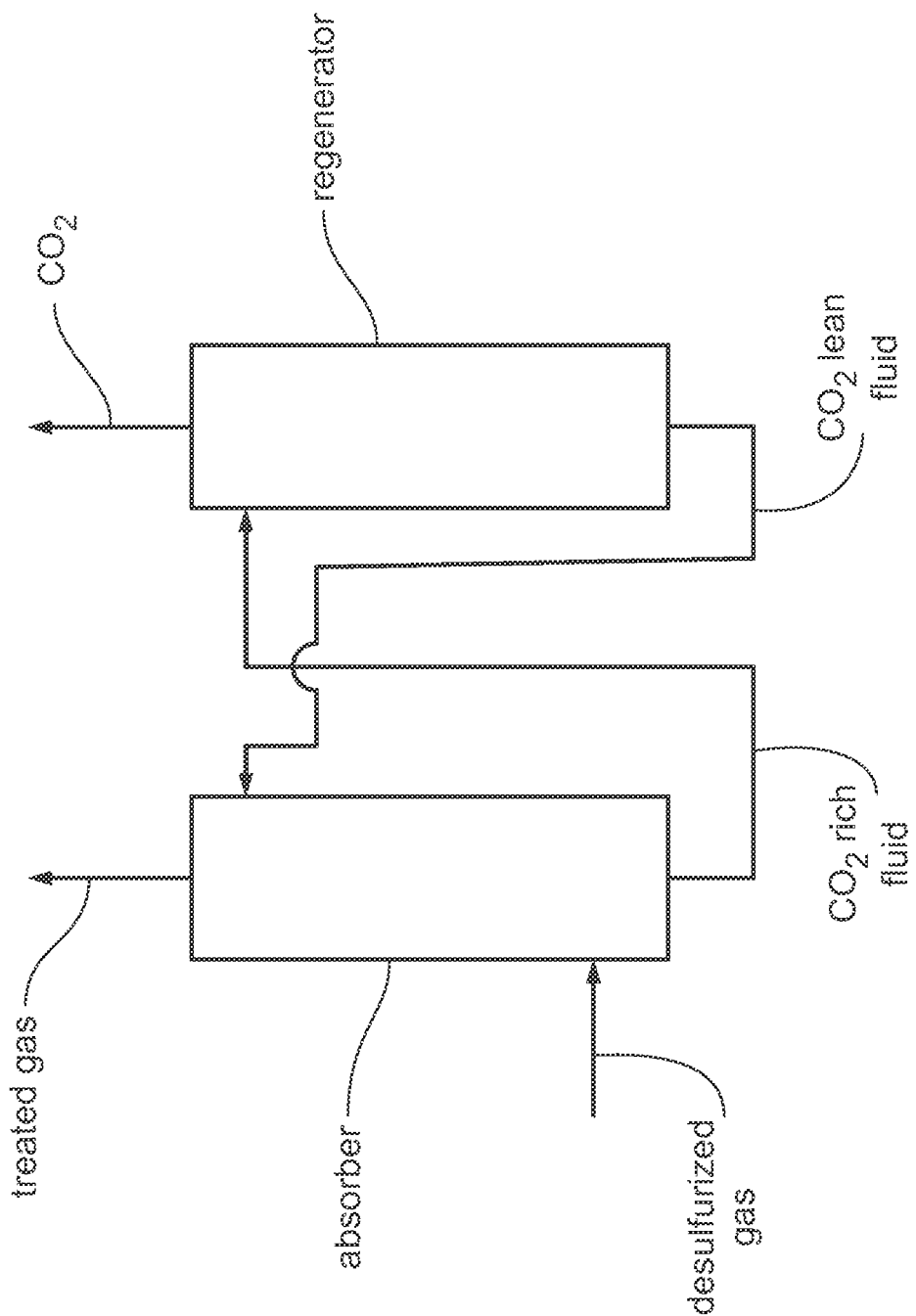
FIG. 3 is a schematic view of an example of a $CO_2$ removal system (or unit) according to some embodiments.

FIG. 3 is a schematic view of an example of a $CO_2$ removal system (or unit) according to some embodiments.

In the following Examples, process flow models were developed using ASPEN PLUS® software (Aspen Technology, Inc., Burlington, Mass., USA), and were utilized in detailed techno-economic analyses to compare the capital and operating costs for leading technologies for stand-alone AGR and the integrated WDP and $CO_2$ capture technologies disclosed herein. These studies utilized a consistent design basis, thereby allowing for a direct comparison of the costs.

EXAMPLE 1

This example illustrates the processing and acid gases removal for methanol synthesis. RECTISOL® solvent for sulfur and $CO_2$ capture is used here as the base case for comparison with the integrated WDP and $CO_2$ capture disclosed herein. The syngas is reacted with steam to shift the gas to obtain a $H_2$/CO ratio of 2 (as required for methanol synthesis). The sulfur removal is carried out downstream of the water gas shift for the RECTISOL® base case, but it can be done either upstream or downstream of the water gas shift for the WDP integrated cases.

Syngas from a solids-fed gasifier, using a Powder River Basin (PRB) coal is used here. This coal contains 0.73 wt % of total sulfur. Total volume of gas used in this example corresponds to the use of two large commercial-scale gasifiers. The syngas composition for this case is taken from a Department of Energy study (DOE-NETL. Cost and Performance Baseline for Fossil Energy Plants. Volume 3a: Low Rank Coal to Electricity: IGCC Cases 2011 May 2011 Contract No.: DOE/NETL-2010/1399) and is provided in Table 1 below.

TABLE 1

| Inlet syngas composition used in Example 1 | |
|---|---|
| Temperature, ° F. | 500 |
| Pressure, psia | 605 |
| Molar flow rate, lbmol/hr | 77,885 |

TABLE 1-continued

Inlet syngas composition used in Example 1

| V-L Mole Fraction | |
|---|---|
| $H_2$ | 0.1456 |
| CO | 0.2832 |
| $CO_2$ | 0.0257 |
| $H_2S$ | 0.0015 |
| COS | 0.0001 |
| $H_2O$ | 0.4854 |
| HCl | 0.0000 |
| Inerts | 0.0585 |
| Total | 1.0000 |

(a) WDP+Modified RECTISOL® Process for $CO_2$ Capture

Figure 4:
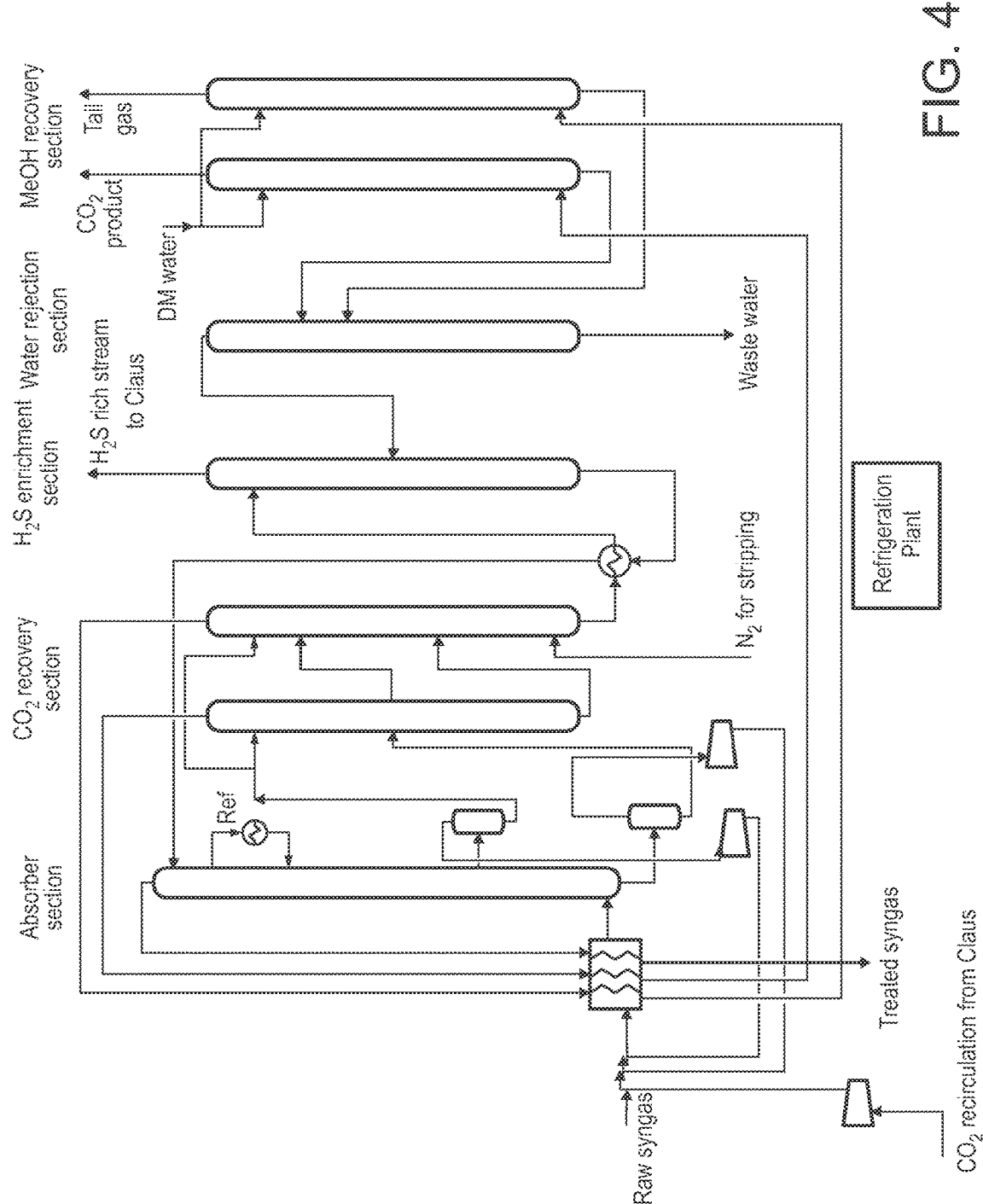
FIG. 4 is a schematic view of an example of a stand-alone RECTISOL® process utilized for removal of S and $CO_2$.

FIG. 4 is a schematic view of an example of the conventional RECTISOL® process utilized for removal of S and $CO_2$. In particular, FIG. 4 shows essential components of a selective RECTISOL® process in which $CO_2$ is recovered as a product and an $H_2S$ enriched stream is sent to a Claus unit to recover sulfur. The $CO_2$ from the Claus unit is recirculated back to the absorber to enhance $CO_2$ capture. Heat integration and some process loops are not shown for the sake of brevity. As shown, there are five main sections in a RECTISOL® design: 1) the absorber section, 2) the $CO_2$ recovery section, 3) the $H_2S$ enrichment sections, 4) the water rejection section and 5) the methanol recovery section or the gas treatment section.

The raw syngas has to be cooled to roughly ambient temperature before it enters the RECTISOL RECTISOL® battery limit. Methanol is injected to prevent any water from freezing as the gas is chilled by exchanging heat with chilled treated syngas, $CO_2$ product gas and tail gas. In the absorber section, raw syngas is washed with chilled methanol to reduce $CO_2$, $H_2S$, $NH_3$ and other contaminants to desired levels. The rich solvent is then pre-flashed to recover $H_2$ and CO, which partly dissolve simultaneously in the chilled methanol. The pre-flashed methanol is flashed further to recover the bulk of the $CO_2$. The last bit of $CO_2$ is stripped out using nitrogen. The flashed methanol is then sent to the $H_2S$ enrichment section where hot regeneration of the solvent along with $H_2S$ enrichment is achieved. The methanol in the $CO_2$ product and the tail gas streams is recovered by washing the gas streams with demineralized water in the methanol recovery section. The water-methanol mixture from the gas treatment at the inlet and the outlet is separated in the water rejection section by simple distillation.

The feed to the standalone RECTISOL® process for this study is taken from a sour shift reactor which brings the $H_2$ to CO ratio to 2:1. The temperature, pressure, and composition of the inlet raw syngas, treated syngas, $CO_2$ product, tail gas and $H_2S$ enriched gas are estimated using an ASPEN PLUS® process model and are given in Table 2 below.

TABLE 2

| Mole Frac | Raw Syngas | Treated Syngas | $CO_2$ product | Tail gas | $H_2S$ enriched gas |
|---|---|---|---|---|---|
| $H_2$ | 0.437 | 0.589 | 0.002 | 0.000 | 1.22E-06 |
| CO | 0.218 | 0.293 | 0.005 | 0.001 | 1.73E-07 |
| $CO_2$ | 0.274 | 0.029 | 0.951 | 0.257 | 0.713 |
| $CH_4$ | 0 | 0 | 0 | 0 | 0 |
| $H_2S$ | 2.64E-03 | 0 | 4.74E-06 | 2.28E-04 | 0.253 |
| COS | 1.79E-04 | 0 | 2.49E-08 | 2.92E-06 | 1.73E-02 |

TABLE 2-continued

| Mole Frac | Raw Syngas | Treated Syngas | $CO_2$ product | Tail gas | $H_2S$ enriched gas |
|---|---|---|---|---|---|
| $NH_3$ | 3.74E-05 | 0 | 0 | 0 | 2.90E-03 |
| $N_2$ + Ar | 0.067 | 0.090 | 0.030 | 0.727 | 1.88E-03 |
| $H_2O$ | 0.002 | 0.000 | 0.012 | 0.016 | 4.31E-08 |
| $CH_3OH$ | 0 | 9.93E-05 | 8.47E-05 | 1.71E-06 | 0.011 |
| Total Flow, lbmol/hr | 43547 | 32254 | 11280 | 1083 | 458 |
| Temperature, °F. | 86 | 70 | 48 | 54 | 68 |
| Pressure, psia | 561 | 550 | 15 | 15 | 16 |

The selective removal of $CO_2$ and $H_2S$ while simultaneously 1) enriching $H_2S$-rich stream, 2) maintaining $H_2S$ specs in the tail gas and the $CO_2$ product, and 3) keeping the percent $CO_2$ capture near 90% makes the process design very complicated. The $H_2S$-rich stream should have more than 25 mol % of $H_2S$ for sulfur recovery in the conventional Claus process. The $H_2S$ in the $CO_2$ product as well as the tail gas should not exceed 5 ppm. The allowable $H_2S$ in the treated syngas can vary from ppm to a few ppb depending on the end use.

Apart from the design complexity, the RECTISOL® process is extremely capital intensive as well as requires large operating costs due to cryogenic operating conditions. A significant portion of the capital cost contribution comes from the large required heat exchangers. A very large heat exchange area is required as the raw syngas is chilled from ambient conditions to −20° F. or lower before it enters the absorber. An even larger heat exchange area is required to chill the hot regenerated methanol to −40° F. or lower before it is recirculated back to the absorber.

The RECTISOL® plant and the refrigeration plant contribute almost equally to the total electricity consumption. The largest power consumers in the RECTISOL® plant are: 1) the chilled regenerated methanol pump, 2) the $H_2$ and CO recirculating compressors, and 3) the $CO_2$ recirculation compressor from the Claus unit. In the refrigeration plant, the compressors alone contribute to the entire power consumption.

By comparison, decoupling the $CO_2$ and $H_2S$ sections significantly simplifies the design and results in large reductions in the capital and operating costs, as illustrated in the following Examples, which illustrate the benefits from the integration of the WDP and the $CO_2$ capture technologies in accordance with the present disclosure.

Figure 5:
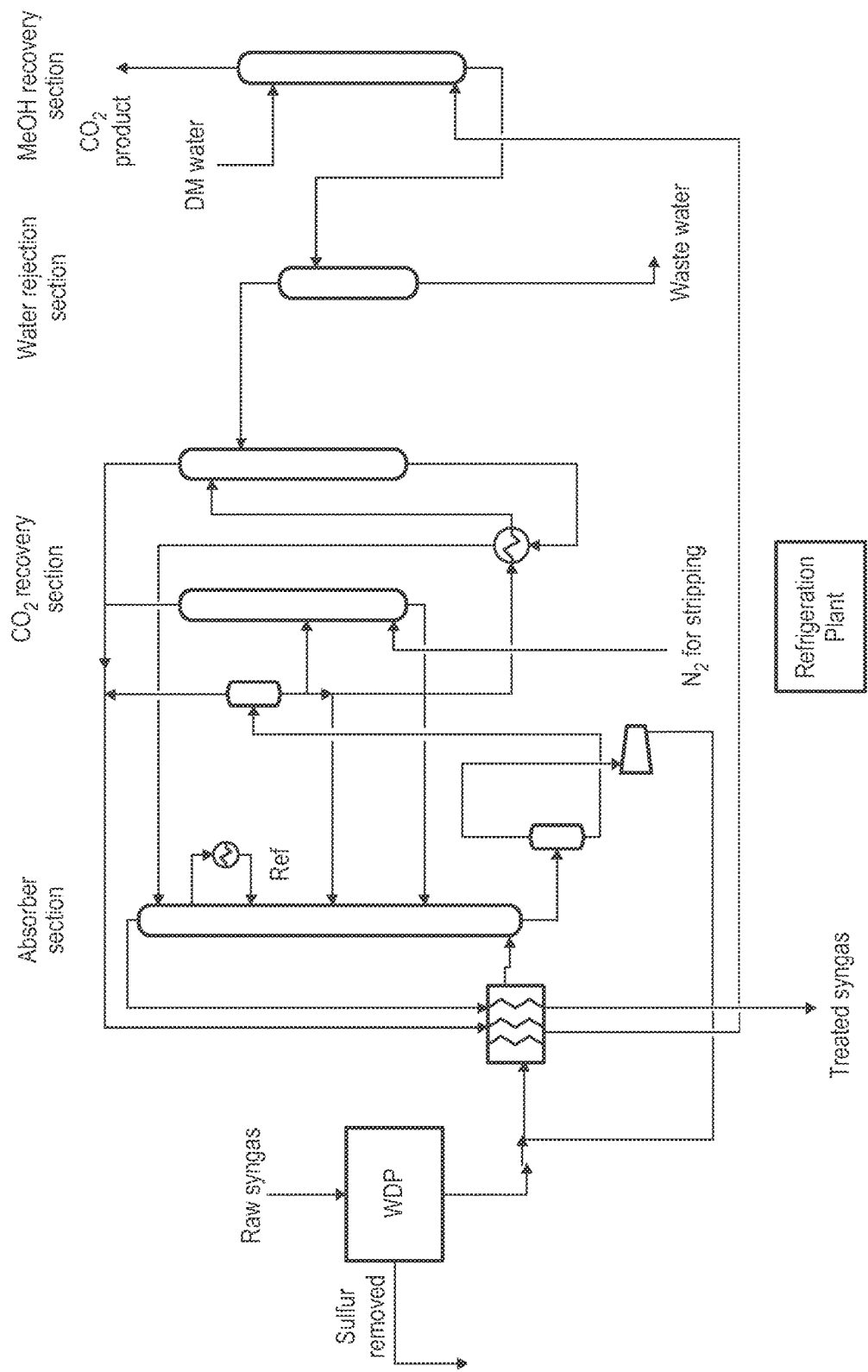
FIG. 5 is a schematic view of an example of a warm gas desulfurization process integrated with a decoupled RECTISOL® process configured for $CO_2$ scrubbing according to some embodiments.

FIG. 5 is a schematic view of an example of the WDP integrated with a decoupled RECTISOL® process configured for $CO_2$ scrubbing according to some embodiments. The WDP removes 99+% sulfur from the raw syngas and the RECTISOL® plant is designed to remove $CO_2$ and other trace components. All the process constraints related to $H_2S$ removal and recovery in a conventional RECTISOL® design such as shown in FIG. 4 vanish, which results in a greatly simplified design. The result is that the decoupled RECTISOL® configuration, such as shown in FIG. 5, has very few process components compared to the conventional RECTISOL® configuration shown in FIG. 4.

As shown in FIG. 5, this embodiment includes an absorber section in which the raw syngas is chilled and treated with chilled methanol. The rich solvent is pre-flashed to recover the $H_2$ and CO products. The solvent is then flashed to atmospheric pressure. The flash regenerated methanol is divided into three sub streams. The first sub stream is recirculated back to the absorber. The second sub stream is stripped using nitrogen and then recirculated to absorber. The third sub stream undergoes hot regeneration and returns to the absorber.

(b) WDP+Modified SELEXOL® Process for $CO_2$ Removal

The main complexity in the selective removal of $H_2S$ and $CO_2$ in the SELEXOL® process comes from the presence of COS. COS in the feed stream poses difficulties in desulfurization when physical solvent absorption systems are employed. The SELEXOL® solvent has a much greater solubility of $H_2S$ than that of $CO_2$, with the solubility of COS in between those of $H_2S$ and $CO_2$. Relative solubilities of $H_2S$ and COS (relative to $CO_2$) in the SELEXOL® solvent are as follows.

TABLE 3

| | DEPG, 25° C. |
|---|---|
| $CO_2$ | 1.00 |
| COS | 2.30 |
| $H_2S$ | 8.82 |

When COS is absent, the desulfurization solvent flow-rate is set for essentially complete $H_2S$ removal and only a small fraction of the $CO_2$ is co-absorbed. When COS is present, a substantially higher flow-rate is required to obtain complete absorption and desulfurization, with consequent increase in amount of $CO_2$ absorbed, resulting in an increase in equipment cost and utility requirements. The co-absorption of $CO_2$ is also increased by the higher solvent flow-rate.

Another approach to address the differences in solubilities for $H_2S$ and COS in the SELEXOL® solvent is to carry out COS hydrolysis to convert the COS to $H_2S$, upstream of the SELEXOL® process. This approach, however, requires additional equipment and an additional processing step, adding to the overall cost of the SELEXOL® process.

Figure 6:
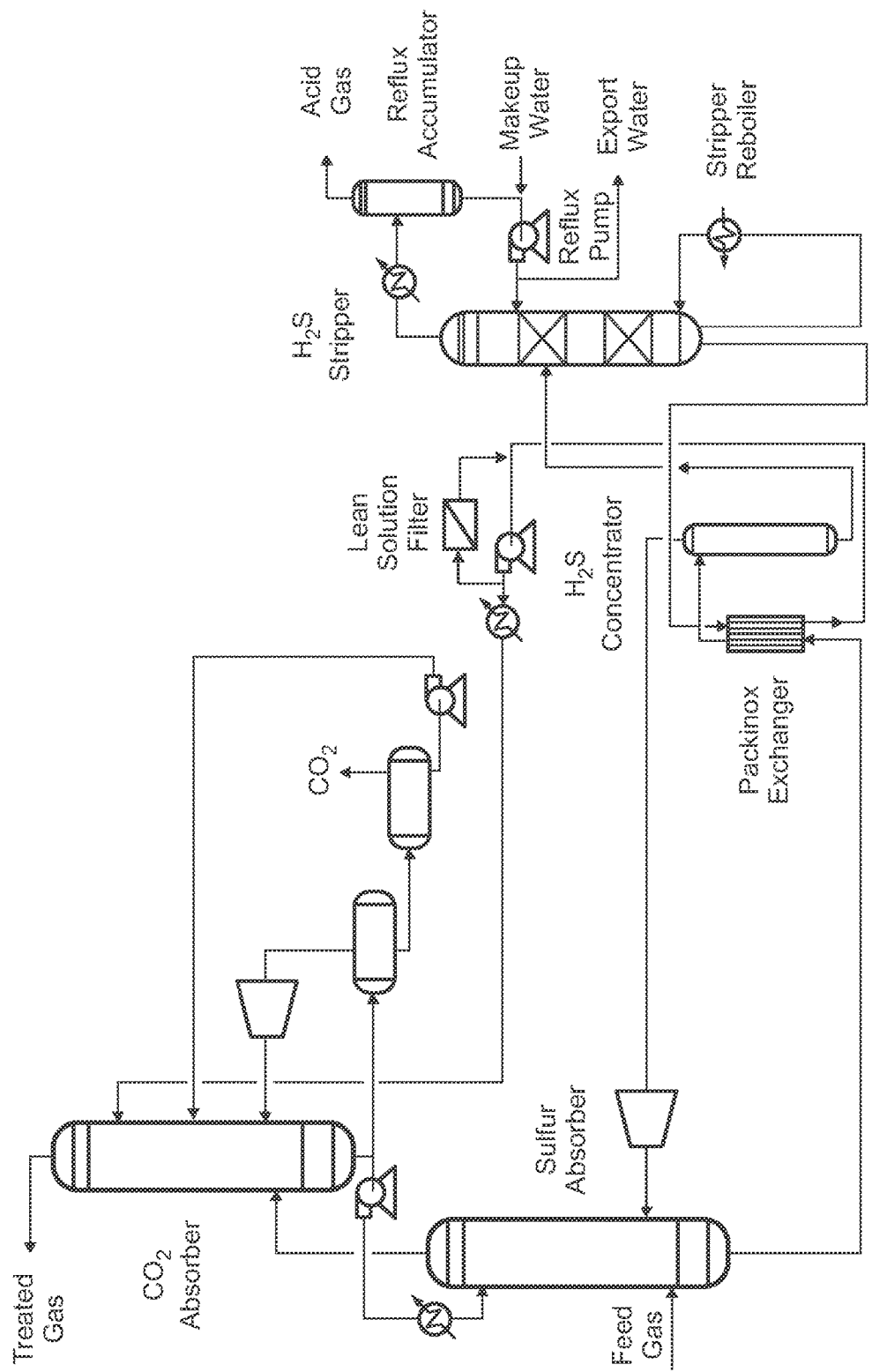
FIG. 6 is a schematic view of an example of a stand-alone SELEXOL® process utilized for removal of S and $CO_2$.

FIG. 6 is a schematic view of an example of the stand-alone SELEXOL® process utilized for removal of S and $CO_2$. The feed gas is sent to the sulfur absorber column, where a slip-stream of the $CO_2$-rich SELEXOL® solvent from the $CO_2$ absorption column is used to absorb $H_2S$ and COS. The syngas, essentially free of $H_2S$ and COS, passes on to the $CO_2$ absorber column. The $CO_2$-rich solution from the $CO_2$ absorber is flashed off in series of flash columns. FIG. 6 shows only one flash column, but typically two to three flashes are used to recover $CO_2$ at different pressures. The gas from the first high pressure flash is recycled to recover $H_2$ and CO, which comes off in the first flash.

The $H_2S$-rich solution from the sulfur absorber column needs to be further processed to concentrate the $H_2S$ for the Claus process and remove $CO_2$. This is carried out in the $H_2S$ concentrator column, followed by thermal regeneration in the stripper column. The $CO_2$ stream from the $H_2S$ concentrator contains small amounts of $H_2S$, and is recycled to the $H_2S$ absorber column.

Figure 7:
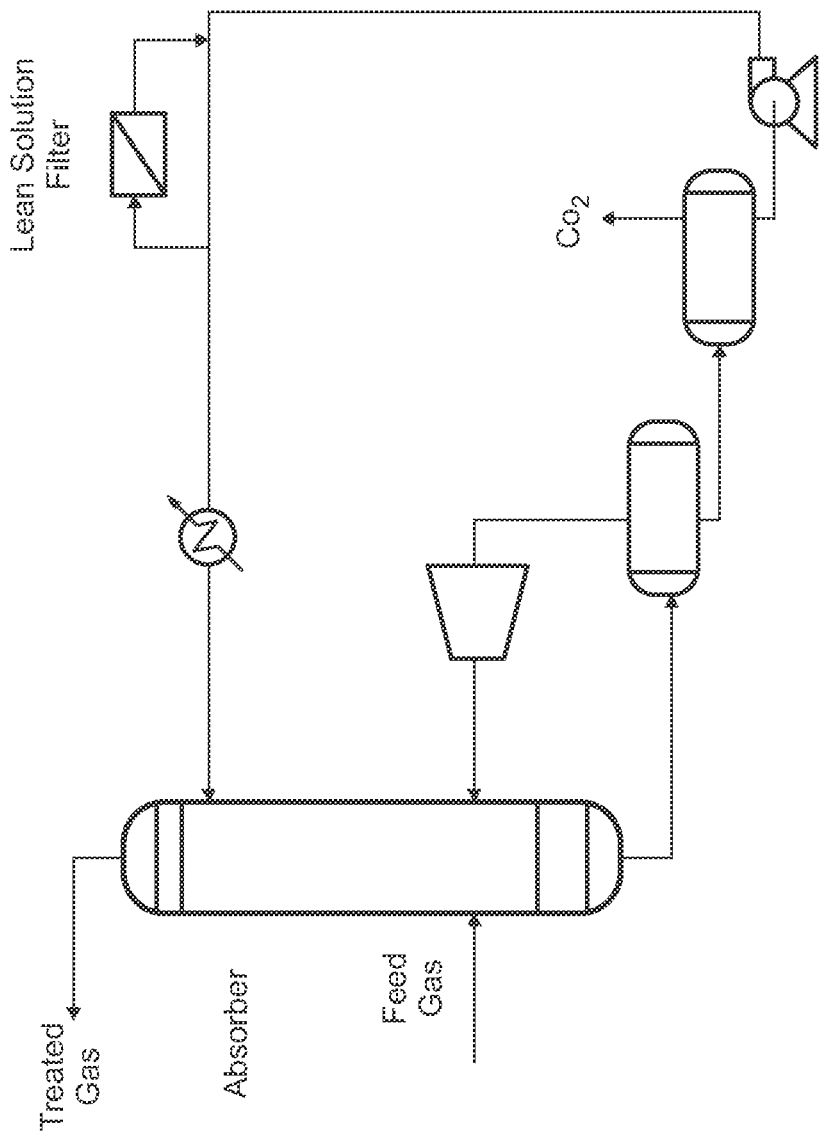
FIG. 7 is a schematic view of an example of a decoupled SELEXOL® process configured for $CO_2$ scrubbing, which is configured for integration with an upstream warm gas desulfurization process, according to some embodiments.

By comparison, FIG. 7 is a schematic view of an example of a decoupled SELEXOL® process configured for $CO_2$ scrubbing, which is configured for integration with an upstream WDP, according to some embodiments. FIG. 7 illustrates that $CO_2$ capture is greatly simplified when sulfur is captured upstream and only $CO_2$ is removed by a SELEXOL® process modified as disclosed herein.

(c) WDP+Activated MDEA.

Activated MDEA can also be used for $CO_2$ capture. Activated MDEA uses MDEA as an aqueous solution which has been activated with some chemicals (example piperazine) to enhance the $CO_2$ absorption in the solvent. Activated MDEA can be used for $CO_2$ capture after the sulfur species has been removed by the WDP.

Results from the different cases are tabulated in Table 4.

TABLE 4—Results from the techno-economic analysis for Example 1 showing projected savings with the integration of the WDP and the AGR technologies over the base case (dual-stage RECTISOL®).

| | RECTISOL® for S and CO2 removal | WDP + RECTISOL® | WDP + SELEXOL® | WDP + Activated MDEA |
|---|---|---|---|---|
| Capital Cost[1], 2011 $(Million) | 1 | 31% reduction | 35% reduction | 35% reduction |
| Annual Operating costs[2], 2011 $(Million) | | 58% positive cash flow | 9% positive cash flow | 22% positive cash flow |

[1]includes cost of initial fills
[2]Operating cost is net cash flow due to steam generation in water gas shift and low temperature gas cooling which generates higher cash flow than consumed in electricity, cooling water and consumables It is seen that a substantial reduction in capital and operating costs is achieved by decoupling the $H_2S$ and $CO_2$ removal from syngas for all three cases.

During this study it was also found that the $H_2S$ enrichment for higher $H_2$:CO ratios (3:1) required for SNG and substantially higher for $H_2$ applications, becomes very difficult with the conventional RECTISOL® process. Decoupling the sulfur and $CO_2$ removal removes this bottleneck and allows the use of chilled methanol-based $CO_2$ only wash.

EXAMPLE 2

This example illustrates processing and acid gas cleanup of a syngas for $H_2$ production. The syngas composition for this example is taken from a Department of Energy study for a solids—fed gasifier with partial quench using PRB coal (case S1B), and is provided in Table 5 below. A dual-stage (current state-of-the-art) SELEXOL® process for sulfur and $CO_2$ removal is used in the DOE example case and the treated syngas is suitable for $H_2$ production. The treated syngas can be purified using a pressure swing adsorption (PSA) step. The same study also reports the operating costs and the capital costs (bare erected costs) for acid gas cleanup using the SELEXOL® process (for both S and $CO_2$). These numbers are used here to compare against the "WDP+activated MDEA for $CO_2$" case. The WDP+activated MDEA uses the Direct Sulfur Recovery Process (DSRP) as opposed to the Claus process for the base case. DSRP was also modeled and included in the economic analysis. As the PSA step is common to both processes, it is not modeled here. All costs are reduced to 2011 $, for consistency.

TABLE 5

| Inlet syngas composition used in Example 2 | |
|---|---|
| Temperature, ° F. | 450 |
| Pressure, psia | 570 |
| Molar flow rate, lbmol/hr | 66,477 |
| V-L Mole Fraction | |
| $H_2$ | 0.1508 |
| CO | 0.3470 |

TABLE 5-continued

Inlet syngas composition used in Example 2

| | |
|---|---|
| $CO_2$ | 0.0183 |
| $H_2S$ | 0.0017 |
| COS | 0.0003 |
| $H_2O$ | 0.4386 |
| HCl | 0.0000 |
| Inerts | 0.0433 |
| Total | 1.0000 |

Two different cases are considered for illustration (a) conventional SELEXOL® process for sulfur and $CO_2$ removal, (b) WDP for sulfur removal and activated MDEA for $CO_2$ removal.

ASPEN PLUS® process models were developed for the WDP, water gas shift, and sulfur recovery process. Activated MDEA was modeled using PROMAX® modeling software (Bryan Research & Engineering, Inc., Bryan, Tex., USA). The WDP allows the choice between the sweet gas shift and the sour gas shift. This allows for integration of the water gas shift with the WDP and the $CO_2$ removal to reduce the overall capital costs, which is possible only with the decoupling of the S and $CO_2$ removal. Hence, the water gas shift and the low temperature gas cooling were also modeled and included in the cost comparison. The SELEXOL® process for S and $CO_2$ capture produces $H_2S$ and uses the Claus process for S recovery. The WDP process produces $SO_2$ and uses the Direct Sulfur Recovery Process (DSRP). DSRP was also modeled and included in the cost comparison. The heat and mass balance were used to size equipment and determine equipment and installed costs using the ASPEN PLUS® Economic Analyzer. The capital cost accounted for the cost of the initial fill (catalysts, sorbents, SELEXOL®/MDEA solvent). Economic analysis of the two cases shows a 35% reduction in the capital costs (installed equipment cost) for WDP+activated MDEA when compared to the base case. The electricity consumption was similar for the two cases. However, with the sweet gas shift, there was a net generation of 18,000 lbs/hr of high pressure steam in the WDP+activated MDEA case compared to net consumption of 369,000 lb/hr of high pressure steam The techno-economic analysis clearly shows the economic benefits of integrating the WDP process with a downstream $CO_2$ capture process according to the present disclosure.

The above Examples are for illustrative purposes only and do not restrict the invention to the $CO_2$ capture processes used in the examples. Similar savings are expected from integration of the WDP with other $CO_2$ capture processes.

In general, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for removing acid gases from a gas stream, the method comprising:
   flowing a feed gas into a desulfurization unit to remove a fraction of one or more sulfur compounds from the feed gas, wherein the desulfurization unit produces a desulfurized gas, wherein, within the desulfurization unit, a carrier gas flowing therein includes regenerated solid particulate sorbent being returned to the desulfurization unit from a regeneration unit; and
   flowing the desulfurized gas into a $CO_2$ removal unit to remove a fraction of $CO_2$ from the desulfurized gas.

2. The method of claim 1, wherein the feed gas comprises a gas selected from the group consisting of: carbon monoxide (CO), carbon dioxide ($CO_2$), hydrogen gas ($H_2$), syngas, shifted syngas, a hydrocarbon (HC), and natural gas; and a combination of two or more of the foregoing.

3. The method of claim 1, wherein flowing the feed gas into the desulfurization unit is done under a condition selected from the group consisting of:
   in a temperature range of about 400° F. or greater;
   in a temperature range of about 400° F. to about 1100° F.;
   in a temperature range of about 100° C. to about 900° C.;
   in a pressure range of about 1 atm to 100 atm;
   in a temperature range of about 400° F. or greater and a pressure range of about 1 atm to 100 atm;
   in a temperature range of about 400° F. to about 1100° F. and a pressure range of about 1 atm to 100 atm; and
   in a temperature range of about 100° C. to about 900° C. and a pressure range of about 1 atm to 100 atm.

4. The method of claim 1, wherein flowing the desulfurized gas into the $CO_2$ removal unit is done under a condition selected from the group consisting of:
   in a temperature range of about −80° F. to about 30° F.;
   in a temperature range of about 30° F. to about 130° F.;
   in a temperature range of about 200° F. to about 900° F.;
   in a pressure range of about 1 atm to about 100 atm;
   in a temperature range of about −80° F. to about 30° F. and a pressure range of about 1 atm to about 100 atm;
   in a temperature range of about 30° F. to about 130° F. and a pressure range of about 1 atm to about 100 atm; and
   in a temperature range of about 200° F. to about 900° F. and a pressure range of about 1 atm to about 100 atm.

5. The method of claim 1, wherein flowing the feed gas into the desulfurization unit comprises flowing the feed gas into contact with the sorbent.

6. The method of claim 5, wherein the sorbent is selected from the group consisting of: a metal oxide, zinc oxide, copper oxide, iron oxide, vanadium oxide, manganese oxide, stannous oxide, nickel oxide, a metal titanate, zinc titanate, a metal ferrite, zinc ferrite, copper ferrite, and a combination of two or more of the foregoing.

7. The method of claim 5, wherein the sorbent comprises a support selected from the group consisting of: alumina ($Al_2O_3$), silicon dioxide ($SiO_2$), titanium dioxide ($TiO_2$), a zeolite, and a combination of two or more of the foregoing.

8. The method of claim 5, wherein the sorbent has an average particle size in a range from about 35 µm to about 175 µm.

9. The method of claim 5, wherein flowing the feed gas into contact with the sorbent comprises flowing the feed gas into contact with a sorbent stream comprising the sorbent and the carrier gas.

10. The method of claim 9, wherein flowing the feed gas into contact with the sorbent stream is done in an adsorber unit, and further comprising outputting the desulfurized gas and a sulfided sorbent from the adsorber unit.

11. The method of claim 10, comprising separating the desulfurized gas from the sulfided sorbent.

12. The method of claim 11, wherein separating the desulfurized gas from the sulfided sorbent comprises flowing the desulfurized gas and the sulfided sorbent into a solids separator.

13. The method of claim 10, comprising flowing the sulfided sorbent into the regenerating unit to produce the regenerated sorbent and a sulfur compound, and flowing the regenerated sorbent into the adsorber unit.

14. The method of claim 13, wherein flowing the sulfided sorbent into the regenerating unit is done at a temperature selected from the group consisting of: a temperature of about 900° F. or greater; and a temperature ranging from about 900° F. to about 1400° F.

15. The method of claim 13, wherein flowing the sulfided sorbent into the regenerating unit comprises flowing the sulfided sorbent into contact with a regenerating agent.

16. The method of claim 15, wherein the regenerating agent comprises air or oxygen gas or an oxygen compound, and the sulfur compound produced in the regenerating unit comprises sulfur dioxide.

17. The method of claim 13, comprising separating the regenerated sorbent from the sulfur compound produced in the regenerating unit.

18. The method of claim 17, comprising, after separating the regenerated sorbent compound from the sulfur compound, producing sulfuric acid, elemental sulfur, or both sulfuric acid and elemental sulfur, from the sulfur compound.

19. The method of claim 1, wherein flowing the desulfurized gas into the $CO_2$ removal unit comprises flowing the desulfurized gas into contact with a $CO_2$ removing agent.

20. The method of claim 19, wherein the $CO_2$ removing agent is selected from the group consisting of:
a solvent-based agent that removes $CO_2$ by gas absorption and subsequent regeneration;
methanol;
dimethyl ethers of polyethylene glycols (DEPG);
N-methyl-2-pyrrolidone (NMP);
sulfolane (2,3,4,5-tetrahydrothiophene-1,1-dioxide);
propylene carbonate;
methyldiethanolamine (MDEA);
activated MDEA (aMDEA);
monoethanolamine (MEA);
diethanolamine (DEA);
triethanolamine (TEA);
diisopropanolamine (DIPA);
diglycolamine (DGA);
potassium carbonate;
a mixture of sulfolane (2,3,4,5-tetrahydrothiophene-1,1-dioxide), water, and one or more of methyldiethanolamine (MDEA), piperazine, or diisopropanolamine (DIPA);
an alkali metal oxide;
an alkali metal carbonate;
a lithium silicate;
an amine-functionalized solid sorbent;
an amine-functionalized silica;
an amine-functionalized zeolite;
an amine-functionalized hydrotalcite;
an amine-functionalized metal-organic framework;
a membrane effective for dissolution and diffusion of $CO_2$, and a combination of two or more of the foregoing.

21. The method of claim 19, wherein the $CO_2$ removing agent comprises a liquid-phase agent, and further comprising flowing the liquid-phase agent into the $CO_2$ removal unit.

22. The method of claim 1, wherein flowing the desulfurized gas into contact with the $CO_2$ removing agent is done in an absorber or adsorber unit, and further comprising outputting from the absorber or adsorber unit a treated gas comprising the reduced fractions of sulfur and $CO_2$.

23. The method of claim 22, wherein flowing the desulfurized gas into contact with the $CO_2$ removing agent produces in the absorber or adsorber unit a $CO_2$-rich stream comprising the $CO_2$ removing agent and $CO_2$, and further comprising:
flowing the $CO_2$-rich stream from the absorber or adsorber unit to a regenerator unit of the $CO_2$ removal unit;
removing $CO_2$ from the $CO_2$-rich stream in the regenerator unit of the $CO_2$ removal unit to produce a $CO_2$-lean stream; and
flowing the $CO_2$-lean stream into the absorber or adsorber unit.

24. The method of claim 1, wherein the $CO_2$ removal unit produces a $CO_2$ output stream, and further comprising outputting the $CO_2$ output stream from the $CO_2$ removal unit and recovering $CO_2$ from the $CO_2$ output stream.

25. The method of claim 1, wherein the $CO_2$ removal unit is effective for removing $CO_2$ without actively removing sulfur from the desulfurized gas.

26. The method of claim 10, wherein the $CO_2$ removal unit is effective for removing $CO_2$ without removing sulfur from the desulfurized gas.

27. The method of claim 1, comprising flowing the desulfurized gas into the $CO_2$ removal unit without cryogenically cooling the desulfurized gas via external refrigeration.

28. The method of claim 1, comprising flowing the feed gas, the desulfurized gas, or both the feed gas and the desulfurized gas into contact with steam in a water-gas-shift unit in the presence of a shift catalyst to produce carbon dioxide ($CO_2$) and hydrogen gas ($H_2$).

29. The method of claim 28, comprising flowing the desulfurized gas into contact with steam in the water-gas-shift unit before flowing the desulfurized gas into the $CO_2$ removal unit.

30. A method for removing acid gases from a gas stream, the method comprising:
flowing a feed gas stream comprising carbon monoxide (CO), carbon dioxide ($CO_2$), and a sulfur compound into contact with a sorbent stream in an adsorber unit to produce a first output gas stream, wherein the sorbent stream comprises a particulate sorbent compound effective for removing the sulfur compound from the feed gas stream, and the first output gas stream comprises a desulfurized gas comprising CO and $CO_2$, and a sulfided sorbent;
separating the desulfurized gas from the sulfided sorbent;
flowing the sulfided sorbent into contact with a regenerating agent in a regenerator unit to produce a second output gas stream, wherein the regenerating agent has a composition effective for removing sulfur from the sulfided sorbent, and the second output gas stream comprises regenerated sorbent compound and a sulfur compound;
separating the regenerated sorbent compound from the sulfur compound;

flowing the regenerated sorbent compound in a carrier gas into the adsorber unit for reuse in desulfurization; and flowing the desulfurized gas into contact with a $CO_2$ removing agent in a $CO_2$ removal unit to produce a treated gas comprising CO and reduced fractions of sulfur and $CO_2$.

* * * * *